United States Patent [19]

Garcia et al.

[11] Patent Number: 5,450,250
[45] Date of Patent: Sep. 12, 1995

[54] METHOD FOR TRANSPARENTLY MARKING THE LOCATION OF DATA FILES ON RECORDING MEDIA

[75] Inventors: Jose A. Garcia, Mesquite, Tex.; Lionel C. Shih, San Jose, Calif.

[73] Assignees: E-Systems, Inc., Dallas, Tex.; Ampex Corporation, Redwood City, Calif.

[21] Appl. No.: 843,399

[22] Filed: Feb. 28, 1992

[51] Int. Cl.⁶ .............................................. G11B 5/09
[52] U.S. Cl. ........................................ 360/48; 360/49; 360/72.1; 360/72.2
[58] Field of Search ................ 360/48, 49, 72.1, 72.2, 360/39; 395/425, 600; 369/275.3

[56] References Cited

U.S. PATENT DOCUMENTS

| | | | |
|---|---|---|---|
| 3,986,208 | 10/1976 | Sykes | 360/49 |
| 4,210,785 | 7/1980 | Huber et al. | 360/12 X |
| 4,321,632 | 3/1982 | Leis et al. | 360/49 |
| 4,622,600 | 11/1986 | Okamoto et al. | 360/32 |
| 4,663,678 | 5/1987 | Blum | 360/72.2 |
| 4,926,272 | 5/1990 | Takamatsu et al. | 360/49 |
| 4,935,824 | 6/1990 | Nakano et al. | 360/48 |

FOREIGN PATENT DOCUMENTS

| | | |
|---|---|---|
| 327201 | 8/1989 | European Pat. Off. . |
| 459041 | 12/1991 | European Pat. Off. . |
| 9107744 | 5/1991 | WIPO . |

OTHER PUBLICATIONS

Freeman, Donald E., et al., "I/O Design=Data Management in Operating Systems", 1977 by Hayden Book Co., Inc., pp. 64-81.
Hanson, Owen, "Design of Computer Data Files", 1982, Computer Science Press, pp. 48-62.
Hewlett Packard Company/Sony Corporation, "Digital Data Storage Format Description"; Revision B, Oct. 1988, pp. 2-7, 2-8, 3-3, and 4-1.

Primary Examiner—Paul V. Kulik
Attorney, Agent, or Firm—Harold E. Meier

[57] ABSTRACT

Separations between the end of one data file and the beginning of the next data file are recognized, without utilizing an entire data storage block by means of a controlling program for a peripheral recording device monitoring the control information headers of helically stored data on a recording tape. When files are stored on the recording tape, the controlling program increments an increase of a file section number by one and increments to zero a data block number at the beginning of a new data file. When the recording device is reading the recording tape and there is detected an incrementation of the file section number and a zero value for a data block number, a recognition is made that this data indicates the end of one data file and the beginning of another data file.

22 Claims, 6 Drawing Sheets

METHOD FOR TRANSPARENTLY MARKING THE LOCATION OF DATA FILES ON RECORDING MEDIA

TECHNICAL FIELD

The present invention relates to the storage of blocks of data on a tape, and more specifically to a method of identifying separations between adjacent data files stored on a tape such as magnetic tape.

BACKGROUND OF THE INVENTION

Normally, when information data files are stored on tape such as a magnetic tape, individual files are separated by areas on the tape known as file marks. A file mark is a block of information on the tape containing predefined standards for identifying the file boundary but normally contains no information regarding the data files the mark is separating. Thus, the mark merely acts as an indicator of the ending of one data file and the beginning of another data file.

Information Data Files consist of a number of physical data blocks which are the minimum recordable entity. A data file may consist of one or more individual physical data blocks. A file mark separating two data files must be recorded over an entire physical data block since presently available recording devices are not capable of recording into a smaller entity. Therefore, where data files on a magnetic tape substantially consist of only one or two physical data blocks, each separated by a file mark, the area available on the tape for the storage of user data will be drastically reduced.

Thus, a need has arisen for a method to indicate the separations between adjacent data files without utilizing an entire block of data storage space.

SUMMARY OF THE INVENTION

The present invention overcomes the foregoing and other problems associated with the prior art by utilizing a transparent file mark with helically recorded data on a magnetic tape. The method utilizes the controlling software of the peripheral recording device to store data block and data file information within the control information header located in each helical track and in horizontal tracks located both above and below the helical tracks.

The control software of the peripheral recording device includes instructions to store two numbers in the control information header which together act as a file mark. These are the File Section Number (FSN) and the Data Block Number (DBN). When a new data file is started, the existing file section number is incremented by one and the existing data block number is set to zero. Later, when the peripheral recording device is actuated to read data from the tape instead of writing to the tape, the recording device interprets an incrementation of the FSN and the zeroing out of the DBN as an indication of a new file. Thus, the equivalent of a file mark is created without requiring an entire block of data space to be utilized as a file mark.

BRIEF DESCRIPTION OF THE DRAWINGS

For a more complete understanding of the present invention and the advantages thereof, reference is now made to the following detailed description taken in conjunction with the accompanying drawings in which.

DETAILED DESCRIPTION OF THE INVENTION

Figure 1:
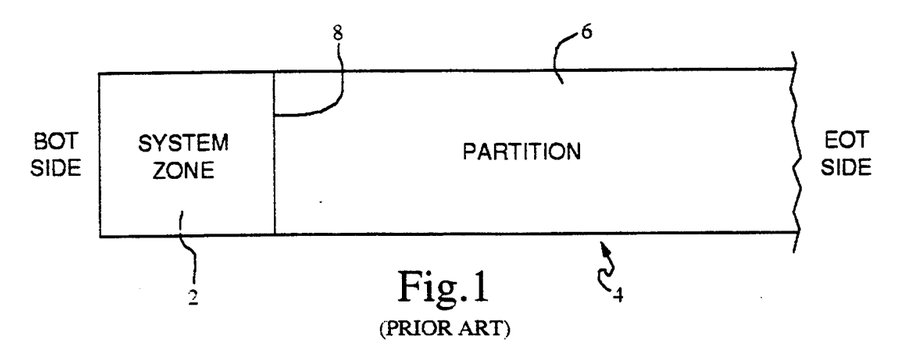
FIG. 1 is a diagram of the prior art method for volume formatting.

Referring now to the drawings, and more particularly to FIG. 1 wherein there is shown an illustration of the prior art formatting of the length of a magnetic tape for data storage. Under prior methods, a single system zone 2 is placed at the beginning of a magnetic tape 4. This zone contains the information necessary for system use during loading and threading operations. The system zone 2 is immediately followed by a single partition 6 starting at the beginning of media (BOM) and continuing until the end-of-media warning (EMW). The area for user data storage begins at the partition boundary 8.

In the present invention, at the beginning of the format procedure, the controlling software instructs a peripheral recording device to prompt a host computer system for the desired number of system zones and for the tape length interval between the system zones. System zones are fixed-length areas on tape, occurring at regular intervals, which are reserved for system use. The system zones are formatted onto the magnetic tape by the peripheral recording device as indicated by the responses of the host computer system. Once the plurality of system zones have been formatted onto the tape, system loading and threading operations may be carried out at any of the system zones. The peripheral recording device and the host computer system are conventional hardware and do not form a part of the present invention.

Figure 2:
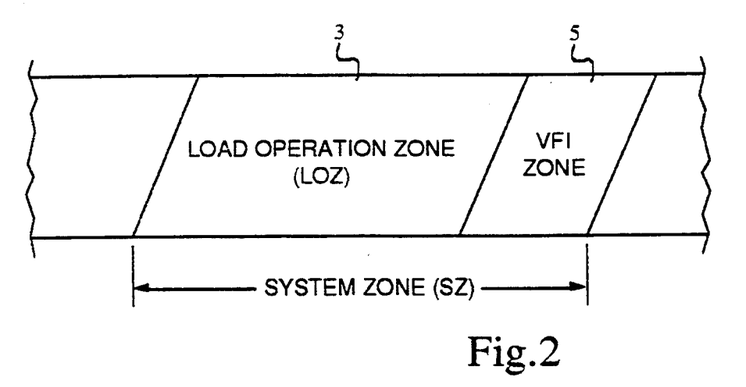
FIG. 2 is a diagram of the format of a system zone on a magnetic tape.

The format of a system zone is illustrated in FIG. 2. The system zone is comprised of two areas. The Load Operation Zone (LOZ) 3 is used during loading and unloading of the tape from a peripheral recording device. The Volume Format Information Zone (VFI) 5 is an area containing information on the data volume format. This information allows the peripheral recording device to locate any partition on the magnetic tape. All system zones contain substantially identical information.

At the same time the system zones are being formatted, the magnetic tape is also being formatted with a plurality of partitions. This process is initiated by a prompt from the controlling software of the peripheral recording device to the host computer system requesting the number of partitions and the length of partitions to be formatted onto the magnetic tape. The software also instructs the peripheral recording device to request the host computer system to choose a Pack, Waste, or Stretch format option. The software then formats partitions onto the tape in accordance with the responses received from the host computer system. The first partition is formatted starting at the Physical Beginning of Medium (PBOM) and may be immediately followed by the next partition or a system zone.

Figure 3:
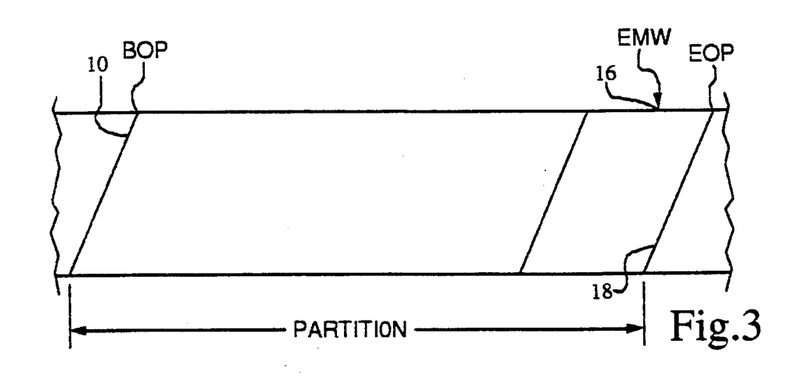
FIG. 3 is a diagram of the format of a partition on a magnetic tape.

Referring to FIG. 3, there is shown the general format of a partition. The beginning of partition (BOP) 10 is a location on the tape that denotes the physical beginning of a partition. The BOP 10 is not an actual recording area on the tape but indicates the first track of the beginning of the partition.

The end of media warning (EMW) 16 is a recording area that contains a warning recording to be sent to the peripheral recording device when there is an attempt to record data in the area. This notifies the recording device that available recording area on the partition is about the end.

The end of partition (EOP) 18 is a location on the tape denoting the physical end of a partition. There is no recorded or physical marking of EOP 18 on a tape. The data track after the last data track of a partition is considered the EOP 18. Therefore, if two partitions are physically adjacent, the BOP 10 of the second partition also denotes the EOP 18 of the previous partition.

Figure 4:
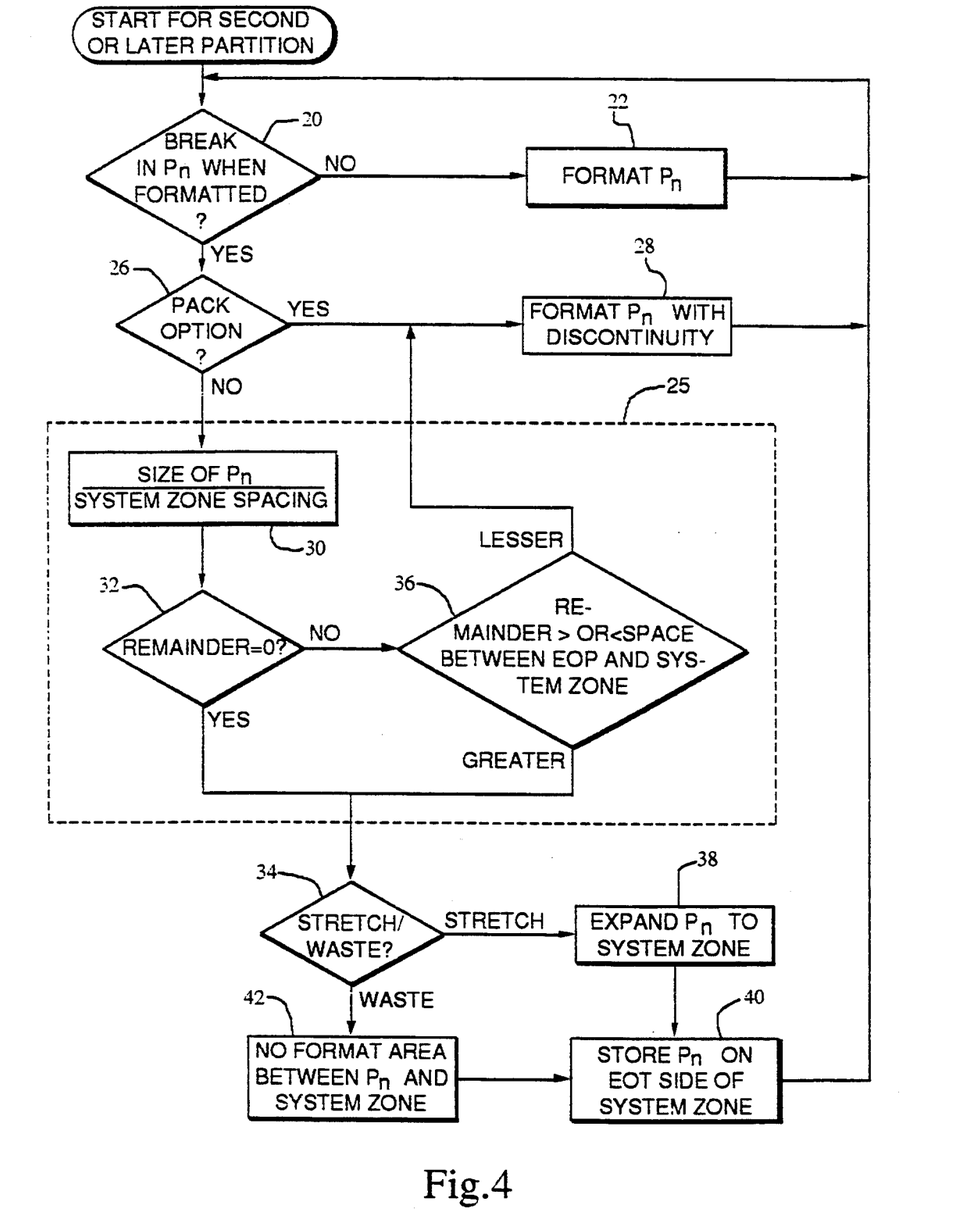
FIG. 4 is a flow diagram of the process for formatting a partition that would be located across a system zone.

During the formatting of the second and later partitions, a condition may arise where a partition ($P_n$) will be formatted across an area of tape containing a system zone. The procedure for responding to this condition is illustrated by FIG. 4. When a new partition ($P_n$) is to be formatted onto the magnetic tape, the host computer system makes a determination at step 20 as to whether the formatting of $P_n$ will cause a discontinuity in the partition. If the formatting of a partition will not cause a discontinuity, $P_n$ is formatted onto the tape at step 22 and the recorder then returns the partitioning sequence to the step 20 to attempt to format the next partition.

If the formatting of $P_n$ will cause a discontinuity in the partition, the controlling software determines at step 26 whether the host system has chosen the Pack Option, which will be discussed more fully later. If the Pack Option has been chosen, the partition is formatted across the system zones at step 28 such that the partition consists of two segments on either side of each system zone. The recording device then attempts to format the next partition and returns to step 20.

If the Waste or Stretch options, which will be more fully discussed later, were chosen the routine for partitioning begins a series of Partition Optimization Steps 25 designed to minimize the number of system zone interruptions for any single partition. The first step 30 divides the size of the Partition by the system zone spacing specified by the host computer system to generate a partition remainder. An inquiry 32 is then made to determine if the remainder is equal to zero. If the remainder is equal to zero, the Partition Optimization Steps 25 are completed and control will pass to step 34.

If the remainder generated at step 30 does not equal zero, the routine determines at step 36 if the remainder is greater than or less than the area remaining between the end of partition (EOP) 18 of the previous partition and the boundary of the next system zone. If the remainder from step 30 is less than the area remaining between the EOP 18 of the previous partition and the system zone, the Partition Optimization Steps 25 are exited and control passes to step 28 where the partition is formatted across the system zone and then seeks to format the next partition by returning to step 20. If the remainder is greater than the area remaining between EOP 18 of previous partition and the system zone, the Partition Optimization Steps 25 are exited and control passes to step 34.

The function of the Partition Optimization Steps 25 is to determine if the partition is to be formatted with a discontinuity despite a choice by the host computer system of the Stretch or Waste option or if the partition is to be formatted on the end-of-tape (EOT) side of the system zone. Partitions to be formatted with a discontinuity are passed through step 20 to step 28. Partitions that will be formatted on the EOT side of a system zone pass to step 34.

At step 34 an inquiry is made to determine if the Stretch or Waste option was chosen by the host computer system. If the Stretch option was chosen, the boundary of previous partition is expanded up to the boundary of the system zone at step 38, thus making the previous partition larger by the difference between its original boundary and the boundary of the system zone. The extended area is available for the storage of user data. The next partition is then formatted on the EOT side of the system zone at step 40. An attempt is then made to format the next partition by returning to step 26.

If the Waste option was chosen at step 34, the area between the previous partition and the system zone is not formatted as a result of step 42. Therefore, the area is unavailable for data storage and is wasted. The next partition is then formatted on the EOT side of the system zone at step 40 and control passes to step 26.

Figure 5:
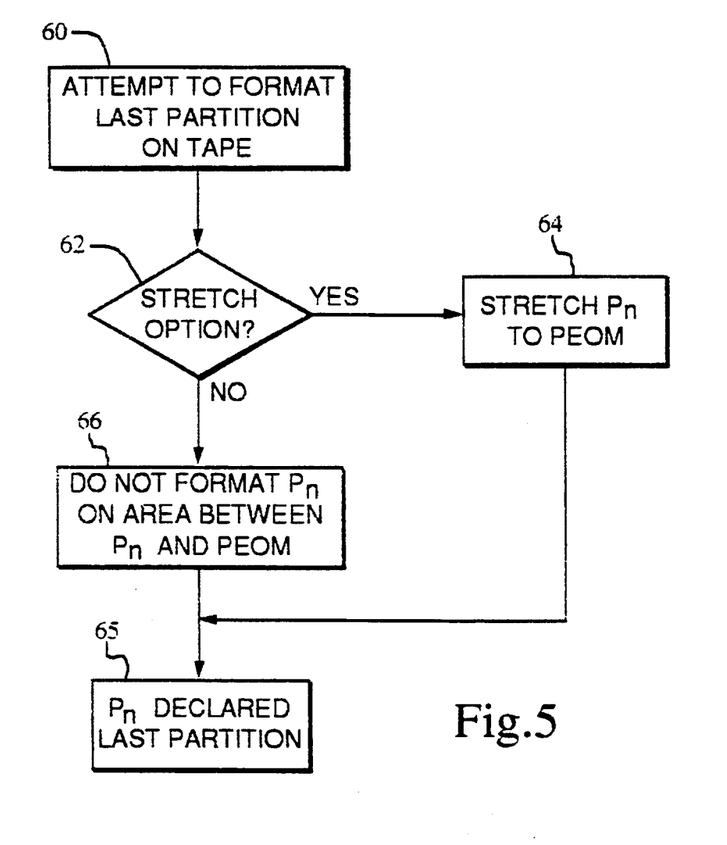
FIG. 5 is a flow diagram of the process to format the last partition at the end of a magnetic tape.

Referring to FIG. 5, there is illustrated the routine run when the last partition $P_n$ on the tape cannot be completely formatted in the area between the EOP 18 of the previous partition and the physical end of the tape medium (PEOM). When a command is received at step 60 to format the last partition $P_n$ that cannot be completely formatted in the remaining tape area, an inquiry 62 is made to determine if the Stretch option was chosen by the host computer system. If the Stretch option was chosen, the last partition $P_n$ is not formatted at the end of the tape and the boundary of the previous partition is expanded at step 64 to the PEOM making this area available for data storage. The expanded partition is then declared the last partition on the volume at step 65. If the Pack or Waste option was specified, the area between the EOP 18 of the previous partition and the PEOM is not formatted (step 66) and is not available for data storage. The previous partition is then declared the last partition on the volume at step 65.

Under normal circumstances, the system zones will be formatted onto the tape at the spacing specified by the host computer system. However, a condition may occur near the PEOM if a requested system zone cannot be completely formatted in the area between the last partition and the physical end of the medium. The procedure for responding to this condition is illustrated in FIG. 6.

Figure 6:
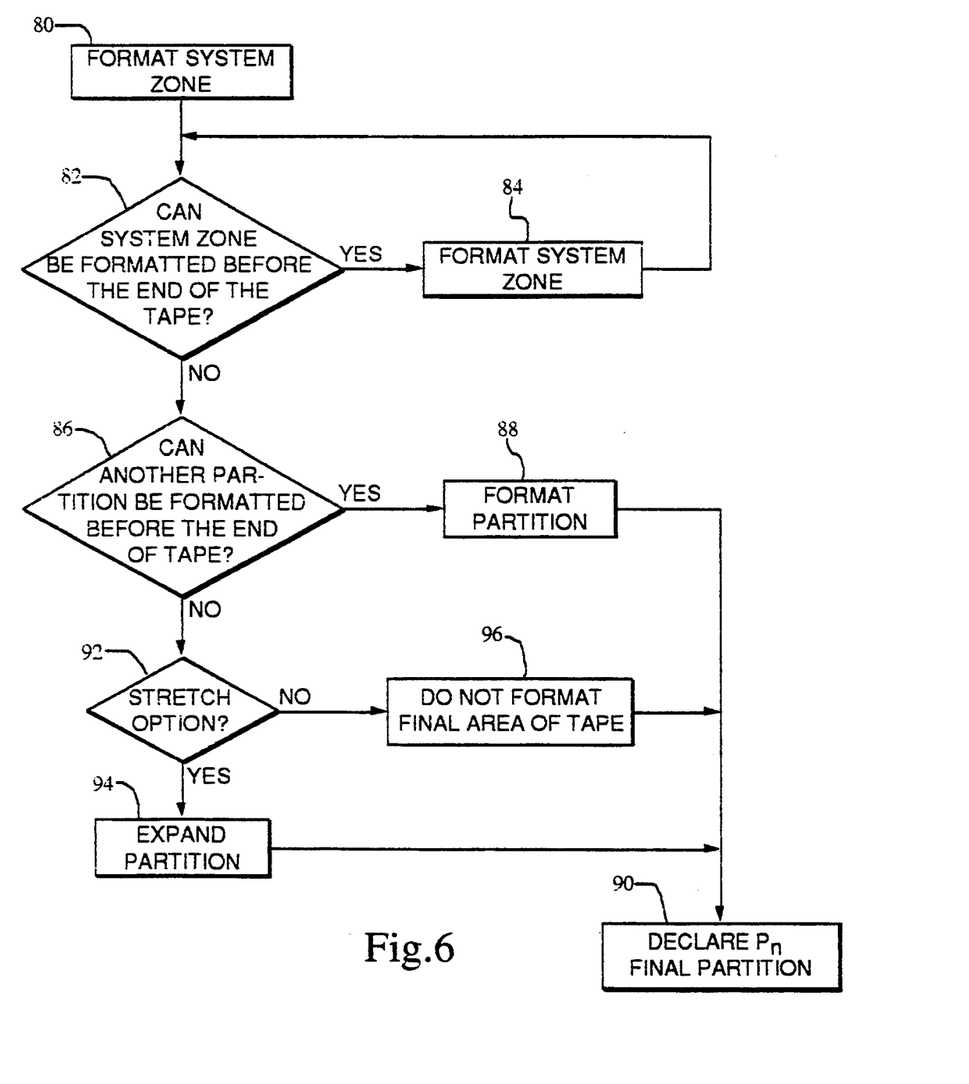
FIG. 6 is a flow diagram of the process to format a system zone which should extend beyond the end of the magnetic tape.

Referring to FIG. 6, when a command is received to format a system zone at step 80, an inquiry 82 is made to determine if the system zone can be completely formatted before the PEOM. If sufficient area is available to format the zone, the system zone is formatted at step 84 and the routine returns to inquiry 82 to format the next partition. If there is not enough space before the PEOM for another system zone, an inquiry 86 determines if another partition $P_n$ can be formatted after the previous partition.

If there is a space available to format another partition on the end of the tape, another partition is formatted at step 88 and the partition is declared at step 90 the last partition on the tape. If a partition can not be formatted on the tape, an inquiry 92 is made to determine if the Stretch option was specified.

If the Stretch option was specified, the boundary of the last partition is extended at step 94 to the PEOM, and the partition is declared at step 90 the last partition on the tape. If the Pack or Waste option was specified, the final area of tape is not formatted (step 96) and is not available for data storage. The previously formatted partition is then declared the final partition on the tape at step 90.

Figure 7A:
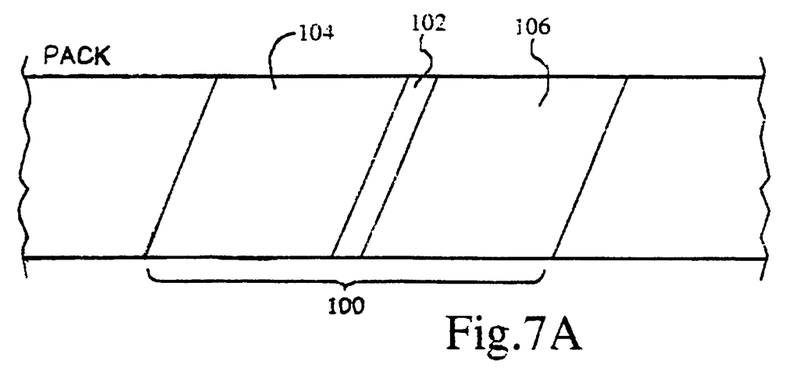
FIGS. 7A–7C illustrates the Pack, Waste and Stretch volume format options.
Figure 7B:
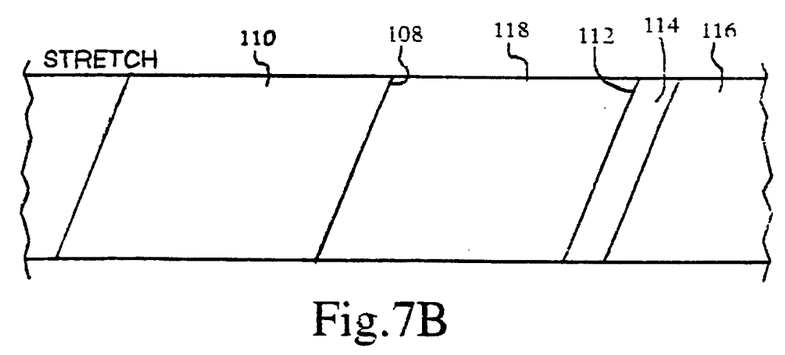
Figure 7C:
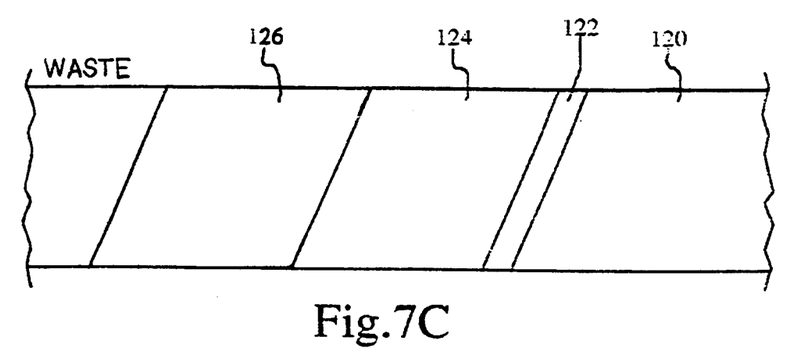

Referring to FIGS. 7A–7C, there is illustrated the three different option formats for formatting when discontinuities in partitions may occur. When the Pack Option is chosen by the host computer system, the partition 100 is formatted on both sides of the system zone 102 such that the partition consists of two segments 104 and 106. When a Stretch Option is used, the EOP boundary 108 of the last formatted partition 110 is extended to the boundary 112 of the system zone 114. The next partition 116 is then formatted immediately after the system zone 114. This format increases the storage area of the partition 110 by the expanded area 118. Finally, when the Waste option is chosen and a partition discontinuity occurs, the next partition 120 is formatted on the EOT side of the system zone 122. The area 124 between the last formatted partition 126 and the system zone 122 is left unformatted and is not available for user data storage.

Figure 8:
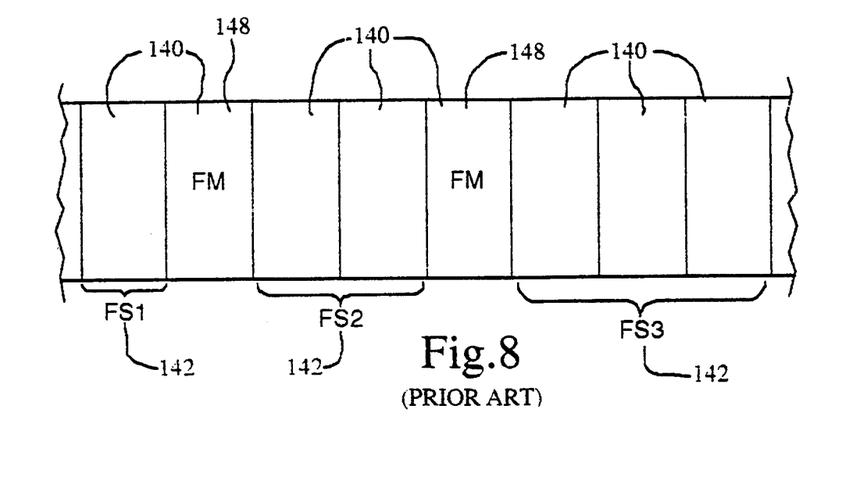
FIG. 8 illustrates the prior art use of file marks.

Data can be stored on the tape whether or not the tape has been formatted. The following description assumes the tape has bee formatted. Once a magnetic tape has been formatted by the peripheral recording device, the tape is ready to accept data storage within the formatted partitions. FIG. 8 demonstrates a prior art tape format by which data is normally stored in longitudinal tracks. Data is stored in discrete units known as physical data blocks 140. A single physical data block or a plurality of physical data blocks in a grouping are referred to as a file section 142. A file mark 148 is used to indicate the separation between two adjacent file sections 142. The file mark 148 requires the use of the storage space of an entire physical data block 140.

Figure 9:
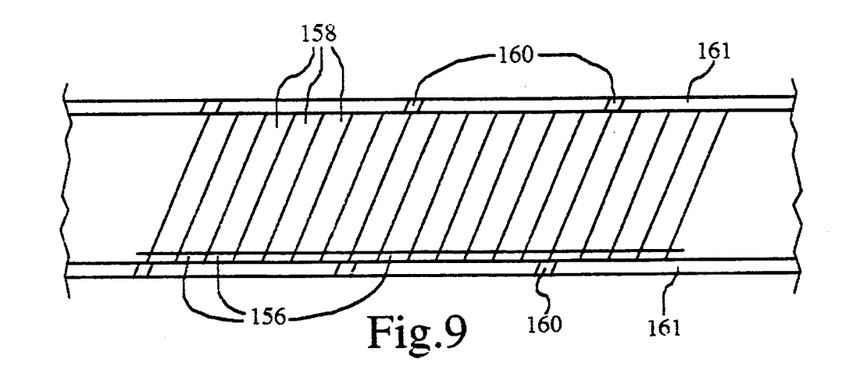
FIG. 9 is a schematic diagram of a magnetic tape with helically and longitudinally recorded information.
Figure 10:
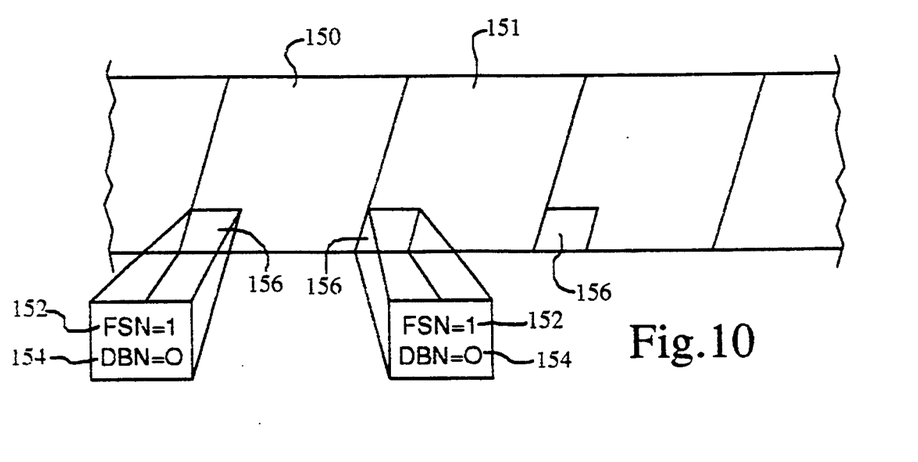
FIG. 10 is an illustration of a magnetic tape utilizing transparent file marks.

Referring to FIG. 9, there is shown the use of helical track recording with the transparent file marks of the present invention. Referring to FIG. 10, there is shown a grouping of file sections directly adjacent to each other using transparent file marks. The ending of file section 150 and the beginning of the next file section 151 are identified by storing a file section number (FSN) 152 and a data block number (DBN) 154 in the control information header 156 of each helical track 158. It is noted that while the headers 156 are shown at the beginning of each helical track 158, the headers 156 may also be interleaved within the helical track 158. In addition the file section number (FSN) 152 and the data block number (DBN) 154 are also stored in the control information header 160 (see FIG. 9) of two longitudinal tracks 161.

When the host computer system requests the peripheral recording device to record a file mark, the file section number 152 is incremented by one and the data block number 154 is set to zero and the numbers recorded in the control information headers 156 and the control information headers 160. The process is controlled by the peripheral recording device during the write procedures.

During the read procedures, the controlling software instructs the peripheral recording device to scan the FSN 152 and DBN 154 in the control information header 156 of each helical track 158 and the control information header of each longitudinal track 161 on the magnetic tape. When the recording device detects the incrementation of the FSN 52 and a zero value for the DBN 154, the recording device recognizes these values as an indication of a file mark and consequently a new file. Thus, the need for recording a file mark over an entire physical data block is eliminated.

If the tape has not been formatted, as long as there is a partition as shown in FIG. 3, the method proceeds in the same manner as if the tape were formatted.

Although preferred embodiments of the invention have been illustrated in the accompanying drawings and described in the foregoing Detailed Description, it will be understood that the invention is not limited to the embodiments disclosed, but is capable of numerous rearrangements and modifications of parts and elements without departing from the spirit of the invention.

We claim:

1. A method of writing on a recording tape a plurality of files of data along a length of the recording tape without recording file marks between files, the method comprising the steps of:
   writing first and second files of user data to a predefined user data area extending horizontally along a length of recording tape, each file having one or more blocks of data written with a last data block in the first file immediately adjacent to a first data block of the second file;
   writing in a predefined horizontal control area extending parallel to the user data area a first file number substantially near a beginning of a first data block of the first file for indicating the physical beginning of the first file; and
   writing in the horizontal control area a second file number incremented by an incremental value near a beginning of the first data block of the second file for indicating a physical beginning of the second file;
   wherein the incrementing of the second file number indicates the location on the tape of the beginning of the second file.

2. The method of claim 1 further including the step of writing in the control area a data block number near the beginning of each data block in the first and second files for indicating the beginning of each data block, the data blocks within each file being numbered consecutively beginning with an initial value; wherein the incrementing of the second file number and the resetting of the data block number to the initial value in the control area indicates the location on the tape of the beginning of the second file.

3. The method of claim 2 further comprising the step of locating the second file by scanning the control area along the length of the recording tape for the incrementing of the second file number and the resetting of the data block number to the initial value.

4. The method of claim 2 wherein the horizontal direction of the user data within the user data area is written along a plurality of tracks transverse to the tape and groupings of one or more of the plurality of transverse tracks comprise the data blocks of the first and second files; and wherein at least one transverse track in each data block of the first and second files further includes in a predetermined location on the track the file number and the data block number for that data block.

5. The method of claim 4 wherein each transverse track within each data block of the first and second files further includes in a predetermined location the track on the file number and data block number for that data block.

6. The method of claim 1 wherein user data within the user data area is written along a plurality of tracks transverse to the tape and groupings of one or more of the plurality of transverse tracks comprise the data blocks of the first and second files; and wherein at least one transverse track in the first data block of the first and second files further includes in a predetermined location on the track the file number for that data block.

7. The method of claim 6 wherein each transverse track of the first data block of the first and second files further includes in a predetermined location on the track the file number for that data block.

8. The method of claim 1 further comprising scanning the control area along the length of the recording tape for the incrementing of the file number to locate the physical beginning of the second file.

9. A method of writing on a recording tape a plurality of files of data along a length of the recording tape without recording file marks between files, the method comprising the steps of:

writing first and second files of user data to a user data area extending horizontally along a length of recording tape, each file having one or more blocks of data written with a last data block in the first file immediately adjacent to a first data block of the second file;

writing in a horizontal control area extending parallel to the user data area a data block number near the beginning of each data block in the first and second files for indicating a physical beginning of each data block, wherein the data block numbers are sequential within each file and begin with an initial value such that the resetting of the data block number between the last data block of the first file and the first data block of the second file to the initial value indicates the physical location on the tape of the beginning of the second file.

10. The method of claim 9 further comprising the step of scanning the control area along the length of the recording tape for the resetting of the data block number to the initial value to locate the physical beginning of the second file.

11. The method of claim 9 wherein user data written within the user data area is written along a plurality of tracks transverse to the horizontal direction of the tape and groupings of one or more of the plurality of transverse tracks comprise the data blocks of the first and second files; and wherein at least one transverse track in each data block of the first and second files further includes in a predetermined location on the track the data block number for that data block.

12. The method of claim 11 wherein each transverse track of each data block further includes in a predetermined location on the track the data block number for that data block.

13. A method for reading a data file recorded on a length of recording tape comprising the steps of:

scanning a control area of a length of recording tape having a user data area running parallel to the control area along the length of the tape; the data area having recorded along the length of the tape a first file and a second file, each file having at least one data block and the control area having written in a location of the control area indicating a physical beginning of each data block a file number and a data block number assigned to each data block of the first and second files; wherein the file number increments a predetermined value and the block number resets to a predetermined initial value between consecutive data blocks in different ones of the plurality of files;

detecting an incrementing of the file number and the resetting of the block data number written in the control area, thereby determining the physical beginning of the first data block in the second file; and reading the first data block in the second file.

14. The method of claim 13 wherein:

user data within the user data area of the tape is written along a plurality of tracks transverse to the length of the tape and groupings of one or more of the plurality of transverse tracks comprise the data blocks of the first and second files;

each transverse track in each data block of the first and second files further includes in a predetermined location on the track the file number and the data block number for that data block; and the method further includes detecting the incrementing of the file number and the resetting of the data block number in at least one of the plurality of transverse track.

15. A recording tape comprising: a control area and a user data area running horizontally and in parallel along a length of the tape; the user data area having a plurality of files written within the data area along the length of the tape, each file including at least one data block; the control area having a file number written within the control area near the physical beginning of a first data block in each of the plurality of files for indicating the physical beginning of the first data block of the file, the file number incrementing a predetermined value between consecutive ones of the plurality of files for indicating the physical beginning on the tape of the next consecutive file.

16. The recording tape of claim 15 wherein the control track further includes a data block number written in the control area and near a physical beginning of each data block of each of the plurality of files indicating the physical beginning on the recording tape of each data block, and wherein the block number resets to a predetermined initial value between consecutive data blocks in different ones of the plurality of files indicating the physical beginning of first data block of the next file.

17. The recording tape of claim 16 wherein user data within the user data area is written along a plurality of tracks transverse to the length of the tape and groupings of one or more of the plurality of transverse tracks comprise the data blocks of the first and second files; and wherein at least one transverse track in each data block of the first and second files further includes in a predetermined location on the track the file number and the data block number for that data block.

18. The recording tape of claim 17 wherein each transverse track of each data block further includes in a predetermined location on the track the file number and data block number for that data block.

19. The recording tape of claim 15 wherein user data within the user data area is written along a plurality of tracks transverse to the tape length of the and groupings of one or more of the plurality of transverse tracks comprise the data blocks of the first and second files; and wherein at least one transverse track in the first data block of the first and second files further includes in a predetermined location on the track the file number corresponding to that data block.

20. A recording tape comprising: a control area and a user data area running in parallel along a length of the tape; the user data area having recorded along the length of the tape a plurality of files, each file including at least one data block; the control area having a data block number written in the control area near a physical beginning of each data block of each of the plurality of fries for indicating the physical beginning of the data block, the block number resetting to a predetermined initial value between consecutive data blocks in consecutive ones of the plurality of files for indicating the beginning on the recording tape of the next file.

21. The recording tape of claim 20 wherein user data written within the user data area is written along a plurality of tracks transverse to the length of the tape and groupings of one or more of the plurality of transverse tracks comprise the data blocks of the first and second files; and wherein at least one transverse track in each data block of the first and second files further includes in a predetermined location on the track the data block number for that data block.

22. The recording tape of claim 21 wherein each transverse track of each data block further includes in a predetermined location on the track the data block number for that data block.

* * * * *

UNITED STATES PATENT AND TRADEMARK OFFICE
CERTIFICATE OF CORRECTION

PATENT NO. : 5,450,250
DATED : September 12, 1995
INVENTOR(S) : Jose A. Garcia, et al.

It is certified that error appears in the above-indentified patent and that said Letters Patent is hereby corrected as shown below:

Column 1, line 10, "such as magnetic", should be --such as a magnetic--.

Column 6, line 11, "52", should be --152--.

Column 9, line 19, "fries", should be --files--.

Signed and Sealed this

Twenty-third Day of April, 1996

Attest:

BRUCE LEHMAN

*Attesting Officer*   *Commissioner of Patents and Trademarks*